US012204508B2

(12) United States Patent
Srinivasulu et al.

(10) Patent No.: US 12,204,508 B2
(45) Date of Patent: Jan. 21, 2025

(54) DATA QUALITY USING ARTIFICIAL INTELLIGENCE

(71) Applicant: Oracle International Corporation, Redwood Shores, CA (US)

(72) Inventors: Midda Dharmika Srinivasulu, Andhra Pradesh (IN); Srinidhi Ramamurthy Sharma, Karnataka (IN); Divyaksh Shukla, Karnataka (IN); Lahari Yedla, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 32 days.

(21) Appl. No.: 18/082,813

(22) Filed: Dec. 16, 2022

(65) Prior Publication Data

US 2023/0124988 A1 Apr. 20, 2023

Related U.S. Application Data (63) Continuation of application No. 16/540,324, filed on Aug. 14, 2019, now Pat. No. 11,550,766.

(51) Int. Cl.
*G06F 16/00* (2019.01)
*G06F 16/215* (2019.01)
(Continued)

(52) U.S. Cl.
CPC ........ *G06F 16/215* (2019.01); *G06F 18/2132* (2023.01); *G06N 3/08* (2013.01); *G06N 20/00* (2019.01)

(58) Field of Classification Search
None
See application file for complete search history.

(56) References Cited

U.S. PATENT DOCUMENTS

| 7,882,127 B2 | 2/2011 | Venkayala et al. |
| 8,849,736 B2 | 9/2014 | Miranda et al. |

(Continued)

FOREIGN PATENT DOCUMENTS

| CN | 104679868 B | 9/2017 |
| CN | 109191030 A | 1/2019 |

OTHER PUBLICATIONS

Dai et al., "Improving Data Quality Through Deep Learning and Statistical Models", Advances in Intelligent Systems and Computing, Jul. 2018.

(Continued)

*Primary Examiner* — Bai D Vu
(74) *Attorney, Agent, or Firm* — Potomac Law Group, PLLC (57) ABSTRACT

Embodiments improve data quality using artificial intelligence. Incoming data that includes a plurality of rows of data and a trained neural network that is configured to predict a data category for the incoming data can be received, where the neural network has been trained with training data including training features, and the training data includes labeled data categories. The incoming data can be processed, where the processing extracts features about the plurality of rows of data to generate metadata profiles that represent the incoming data. Using the trained neural network, a data category for the incoming data can be predicted, where the prediction is based on the generated metadata profiles.

18 Claims, 7 Drawing Sheets

(51) Int. Cl.
*G06F 18/2132* (2023.01)
*G06N 3/08* (2023.01)
*G06N 20/00* (2019.01)

(56) References Cited

U.S. PATENT DOCUMENTS

| | | |
|---|---|---|
| 8,868,516 B2 | 10/2014 | Laredo et al. |
| 9,703,823 B2 | 7/2017 | Daly et al. |
| 9,898,467 B1 | 2/2018 | Pitzel et al. |
| 2003/0212679 A1 | 11/2003 | Venkayala et al. |
| 2004/0158562 A1 | 8/2004 | Caulfield et al. |
| 2010/0179930 A1 | 7/2010 | Teller et al. |
| 2015/0310055 A1 | 10/2015 | Derstadt |
| 2019/0043070 A1* | 2/2019 | Merrill .............. G06Q 30/0205 |
| 2019/0139004 A1 | 5/2019 | Vukovic et al. |
| 2020/0285983 A1* | 9/2020 | Bhattacharyya ....... G06N 20/10 |

OTHER PUBLICATIONS

Gosain et al., "Neural Network Approach to Predict Quality of Data Warehouse Multidimensional Model", Proc. of Int. Conf. on Advances in Computer Science, pp. 241-244, 2010.

Gudivada et al., "Data Quality Considerations for Big Data and Machine Learning: Going Beyond Data Cleaning and Transformations", International Journal on Advances in Software 10.1 (2017), pp. 1-20.

Mahankali, "The machine learning approach to data quality", Data, Analytics & Artificial Intelligence, Wipro, retrieved from https://www.wipro.com/en-IN/analytics/the-machine-learning-approach-to-data-quality/ on May 16, 2019.

* cited by examiner

| Data Hash | Starts With | Ends With | Length | Length Category | Alphabetical | Numeric | Alphanumeric | Max-Length | Mean-Length | Seven |
|---|---|---|---|---|---|---|---|---|---|---|
| 5.426481e-39 | 73.0 | 78.0 | 11.0 | 0.0 | 1.0 | 0.0 | 0.0 | 44.0 | 14.956522 | 0.0 |
| 3.694413e-39 | 83.0 | 46.0 | 28.0 | 0.0 | 1.0 | 0.0 | 0.0 | 44.0 | 14.956522 | 0.0 |
| 5.600709e-39 | 66.0 | 78.0 | 5.0 | 0.0 | 1.0 | 0.0 | 0.0 | 44.0 | 14.956522 | 0.0 |
| 8.122364e-39 | 66.0 | 78.0 | 6.0 | 0.0 | 1.0 | 0.0 | 0.0 | 44.0 | 14.956522 | 0.0 |
| 3.278591e-39 | 83.0 | 83.0 | 44.0 | 0.0 | 1.0 | 0.0 | 0.0 | 44.0 | 14.956522 | 0.0 |
| 5.530304e-39 | 73.0 | 41.0 | 26.0 | 0.0 | 1.0 | 0.0 | 0.0 | 44.0 | 14.956522 | 0.0 |
| 5.026051e-39 | 80.0 | 69.0 | 9.0 | 0.0 | 1.0 | 0.0 | 0.0 | 44.0 | 14.956522 | 0.0 |
| 3.258943e-37 | 65.0 | 65.0 | 7.0 | 0.0 | 1.0 | 0.0 | 0.0 | 44.0 | 14.956522 | 0.0 |
| 4.212718e-39 | 67.0 | 83.0 | 23.0 | 0.0 | 1.0 | 0.0 | 0.0 | 44.0 | 14.956522 | 0.0 |
| 5.426481e-39 | 73.0 | 78.0 | 11.0 | 0.0 | 1.0 | 0.0 | 0.0 | 44.0 | 14.956522 | 0.0 |
| 7.666884e-39 | 72.0 | 83.0 | 27.0 | 0.0 | 1.0 | 0.0 | 0.0 | 44.0 | 14.956522 | 0.0 |
| 8.613894e-39 | 72.0 | 71.0 | 9.0 | 0.0 | 1.0 | 0.0 | 0.0 | 44.0 | 14.956522 | 0.0 |
| 3.194797e-39 | 67.0 | 67.0 | 24.0 | 0.0 | 1.0 | 0.0 | 0.0 | 44.0 | 14.956522 | 0.0 |
| 2.294487e-38 | 66.0 | 65.0 | 32.0 | 0.0 | 1.0 | 0.0 | 0.0 | 44.0 | 14.956522 | 0.0 |

| Data Hash | Starts With | Ends With | Length | Length Category | Alphabetical | Numeric | Alphanumeric | Max-Length | Mean-Length | Seven |
|---|---|---|---|---|---|---|---|---|---|---|
| 1.423070e-38 | 51.0 | 50.0 | 15.0 | 0.0 | 0.0 | 1.0 | 0.0 | 15.0 | 15.0 | 1.0 |
| 2.060632e-38 | 51.0 | 52.0 | 15.0 | 0.0 | 0.0 | 1.0 | 0.0 | 15.0 | 15.0 | 1.0 |
| 4.035302e-39 | 51.0 | 56.0 | 15.0 | 0.0 | 0.0 | 1.0 | 0.0 | 15.0 | 15.0 | 1.0 |
| 8.033746e-39 | 51.0 | 50.0 | 15.0 | 0.0 | 0.0 | 1.0 | 0.0 | 15.0 | 15.0 | 0.0 |
| 1.130188e-38 | 51.0 | 55.0 | 15.0 | 0.0 | 0.0 | 1.0 | 0.0 | 15.0 | 15.0 | 3.0 |
| 3.276619e-39 | 51.0 | 48.0 | 15.0 | 0.0 | 0.0 | 1.0 | 0.0 | 15.0 | 15.0 | 2.0 |
| 4.756626e-39 | 51.0 | 51.0 | 15.0 | 0.0 | 0.0 | 1.0 | 0.0 | 15.0 | 15.0 | 1.0 |
| 5.370551e-39 | 51.0 | 50.0 | 15.0 | 0.0 | 0.0 | 1.0 | 0.0 | 15.0 | 15.0 | 4.0 |
| 3.569997e-39 | 51.0 | 49.0 | 15.0 | 0.0 | 0.0 | 1.0 | 0.0 | 15.0 | 15.0 | 2.0 |
| 5.334342e-39 | 51.0 | 48.0 | 15.0 | 0.0 | 0.0 | 1.0 | 0.0 | 15.0 | 15.0 | 1.0 |
| 5.757200e-39 | 51.0 | 51.0 | 15.0 | 0.0 | 0.0 | 1.0 | 0.0 | 15.0 | 15.0 | 5.0 |
| 4.974487e-39 | 51.0 | 55.0 | 15.0 | 0.0 | 0.0 | 1.0 | 0.0 | 15.0 | 15.0 | 3.0 |
| 3.930010e-38 | 51.0 | 49.0 | 15.0 | 0.0 | 0.0 | 1.0 | 0.0 | 15.0 | 15.0 | 4.0 |
| 3.147920e-39 | 51.0 | 52.0 | 15.0 | 0.0 | 0.0 | 1.0 | 0.0 | 15.0 | 15.0 | 1.0 |
| 6.241751e-39 | 51.0 | 49.0 | 15.0 | 0.0 | 0.0 | 1.0 | 0.0 | 15.0 | 15.0 | 2.0 |
| 4.003532e-39 | 51.0 | 49.0 | 15.0 | 0.0 | 0.0 | 1.0 | 0.0 | 15.0 | 15.0 | 2.0 |

DATA QUALITY USING ARTIFICIAL INTELLIGENCE

FIELD

The embodiments of the present disclosure generally relate to improving data quality using artificial intelligence.

BACKGROUND

Big data has grown even larger in recent times, and the computing problems presented by big data have similarly grown. For example, tangible benefits can be derived from data analytics, data management, and general data processing, however the quality of data can create variations in these benefits. At times, poor data quality can limit or even negate the benefits of big data. Accordingly, improving the quality of data can be beneficial to organizations or entities that regularly generate or receive data. However, conventional techniques for accomplishing this feat can often consume a large amount of time and resources. Efficient techniques for improving the quality of data can therefore provide benefits to organizations or entities that implement these techniques.

SUMMARY

The embodiments of the present disclosure are generally directed to systems and methods for improving data quality using artificial intelligence. Incoming data that includes a plurality of rows of data and a trained neural network that is configured to predict a data category for the incoming data can be received, where the neural network has been trained with training data including training features, and the training data includes labeled data categories. The incoming data can be processed, where the processing extracts features about the plurality of rows of data to generate metadata profiles that represent the incoming data. Using the trained neural network, a data category for the incoming data can be predicted, where the prediction is based on the generated metadata profiles.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

Embodiments improve data quality using artificial intelligence. Data can be received, obtained, or otherwise be made available in a variety of circumstances, and in some instances the data may not include metadata, structure, or other identifying information. For example, a data dump may include uncategorized or unstructured data, and it may be beneficial to store this data in a database. Data that does not include accompanying information, structure, or other organizational aspects can be difficult to store and manage. In general, quantities of data that lack structure and consistency can be considered poor quality data. Data that lacks quality poses significant challenges. For example, it can be difficult to store unstructured data in a structured database or other data structure. The benefits of big data, such as data analytics or machine learning, can also be limited with poor quality data. Embodiments aim to improve the quality of data using artificial intelligence, such as a machine learning model.

Embodiments include a trained machine learning model, such as a neural network, that is trained based on data with a known structure, such as labeled and/or categorized data. For example, features from this data can be extracted to generate metadata profiles, which can be used to train the machine learning model. Once trained, the machine learning model can be configured to receive input data (e.g., processed incoming data) and generate data quality improvement predictions. For example, the incoming data can be unstructured, lack consistency, or otherwise lack data properties related to quality. The incoming data can be processed, such as to extract features from the data and generate metadata profiles. In some embodiments, the processed incoming data (e.g., metadata profiles) can be fed to the trained machine learning model as input, and the model can generate predictions to improve the quality of the incoming data. For example, data categorization predictions can be generated that categorize this incoming data. These category predictions can improve the organization/structure of the data, and thus improve the data quality.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
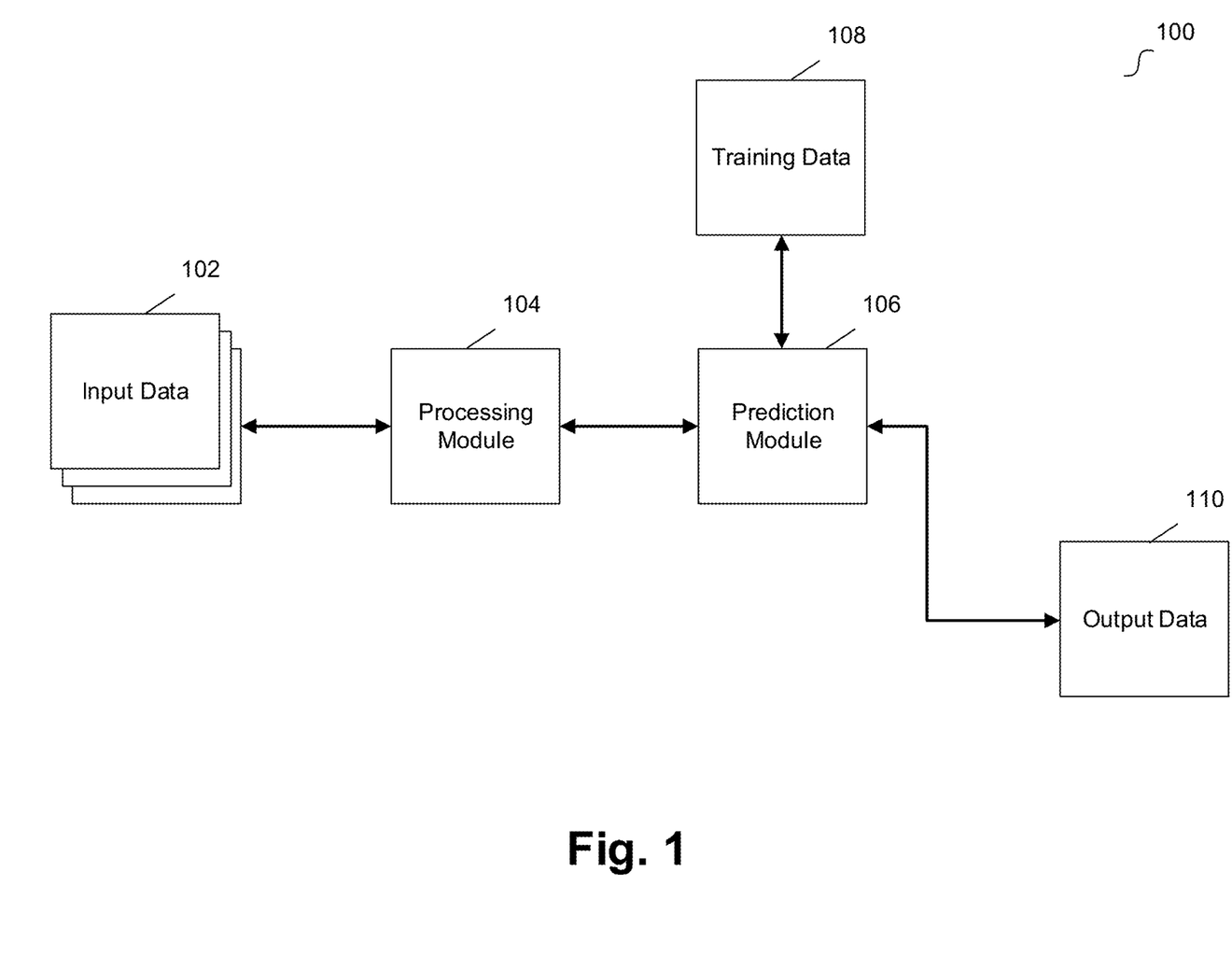
FIG. 1 illustrates a system for improving data quality using artificial intelligence according to an example embodiment.

FIG. 1 illustrates a system for improving data quality using artificial intelligence according to an example embodiment. System 100 includes input data 102, processing model 104, prediction module 106, training data 108, and output data 110. In some embodiments, input data 102 can include several elements or rows of data, and the data can be processed by processing module 104. For example, processing module 104 can generate metadata profiles based on input data 102. In some embodiments, the metadata profiles, not the input data itself, is fed to prediction module 106.

In some embodiments, prediction module 106 can be a machine learning module (e.g., neural network) that is trained by training data 108. For example, training data 108 can include labeled data, such as metadata profiles generated by processing labeled and/or structured data. In some embodiments, the output from processing module 104, such as the processed input data (e.g., metadata profiles), can be fed as input to prediction module 106. Prediction model 106 can generate output data 110, such as data quality improvements for the input data 102. In some embodiments, output 110 can be one or more predicted data categories that can be used to organized and/or store input data 102 in a structured manner.

Embodiments provide a number of advantages over traditional data quality enhancement techniques. In a number of circumstances, quality adjustments to data are achieved manually, such as through manual classification or manual transformation to accomplish consistency. For example, a data scientist may be tasked with reviewing data entries to classify and/or transform the various entries to achieve a structured result that improves data quality. Embodiments provide several advantages over this manual process.

Embodiments leverage offline training of a learning model to achieve efficiency. For example, when incoming data is received, the data can be processed and efficiently fed to the trained machine learning model to generate predicted quality improvements, such as classifications. On the other hand, a manual process that involved a data scientist would be far less time efficient at least because the scientist would not be able to generate the quality improvements nearly as quickly. In addition, deploying computing resources to improve data quality conserves the efforts of specialized human resources, such as data scientists.

Some traditional techniques also attempt an automated approach to improve data quality, however these too have their drawbacks. For example, some techniques use explicitly defined rules, however such inflexible rules often fail to achieve reliable data quality enhancement results in the presence of variations in the data. Other conventional implementations do not generate the types of metadata profiles considered in embodiments. For example, these metadata profiles are able to capture trends in groups of data when generating a data category prediction for a particular element or row of data.

In addition, the metadata profiles contemplated in embodiments are also able to take advantage of the benefits of a machine learning model by leveraging trends in groups of structured/labeled/categorized data to enhance the quality of an incoming group of data. In the absence of processing of the incoming/training data, a machine learning model is not as readily equipped to learn trends in the data and later identify these trends when generating predictions. Accordingly, embodiments are able to predict data quality improvements over a number of elements or rows of incoming data, even in the presence of variation.

Figure 2:
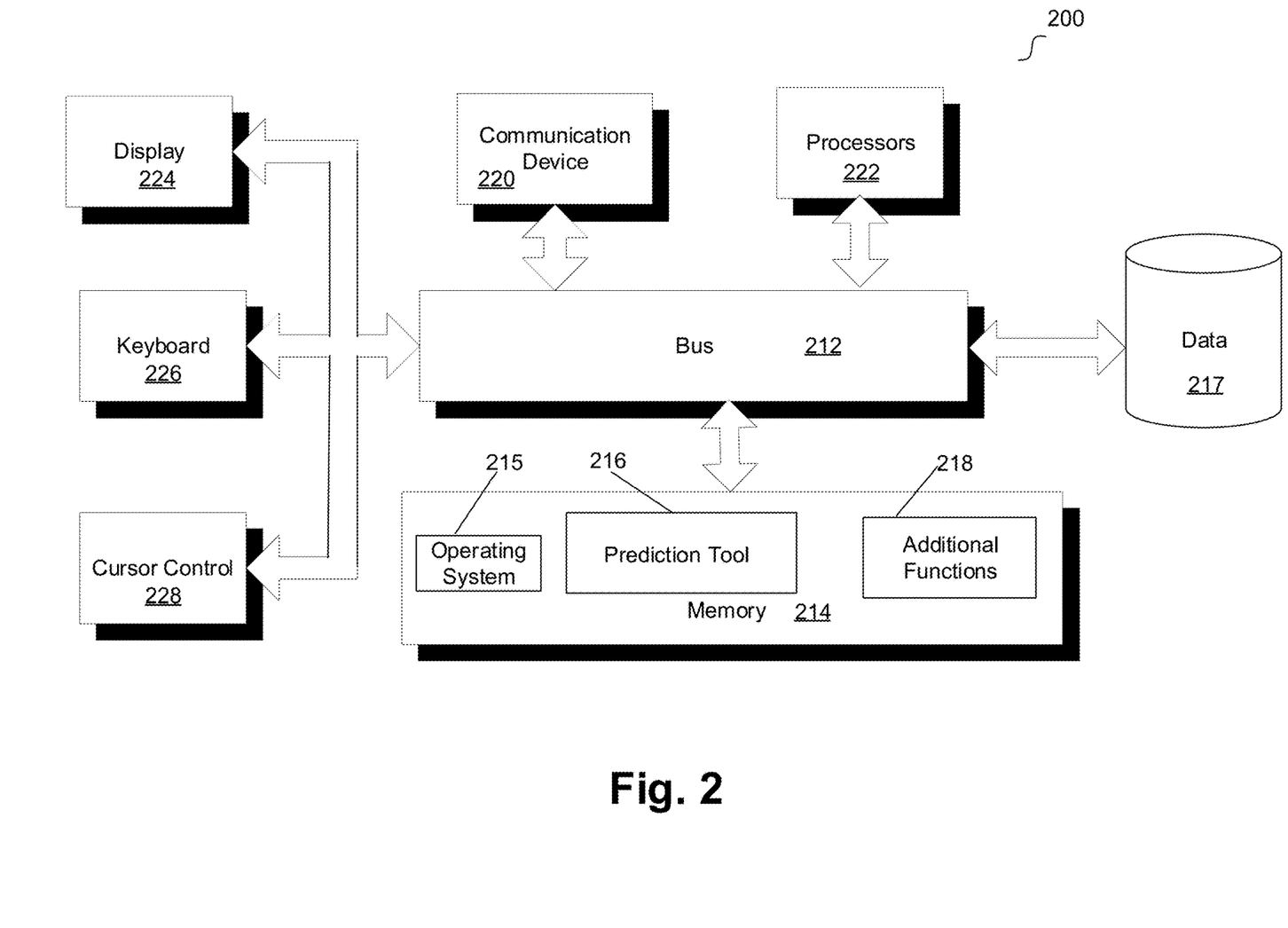
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, prediction tool 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, a prediction tool 216 that implements the data quality improvement functionality disclosed herein, as well as other applications modules 218. Operating system 215 provides operating system functionality for system 200. In some instances, prediction tool 216 may be implemented as an in-memory configuration. In some implementations, when system 200 executes the functionality of prediction tool 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Cloud Infrastructure, Oracle® Cloud Platform, Oracle® Cloud Applications, for example. Prediction tool 216, other applications module 218, and any other suitable component of system 200 can include various modules of Oracle® Data Science Cloud Service, Oracle® Data Integration Service, or other suitable Oracle® products or services.

A database 217 is coupled to bus 212 to provide centralized storage for modules 216 and 218 and to store, for example, data received by computer vision tool 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component.

Embodiments improve data quality for incoming data. Referring back to FIG. 1, training data 108 can train prediction module 106 to generate quality enhancement predictions, such as output 110, for input data 102, such as after input data 102 is processed by processing module 104. Data quality can be a measure to assess the usefulness of data elements when stored in a database or data warehouse, such as when used for Business Intelligence and Analytic models. For example, data in data warehouses can be obtained from multiple sources and formats. In some embodiments, this data may not be standardized, labelled, or may have missing entries. If such ambiguous data is fed to analytic models, performance often suffers. In some embodiments, data quality processes can be deployed on data obtained from various sources before they are analyzed. This can include labelling, standardization, rationalization, validation, outlier detection, and the like.

Embodiments use machine learning models, such as neural networks, to improve data quality. Neural Networks can include multiple nodes called neurons that are connected to other neurons via links or synapses. Some implementations of neural networks can be aimed at classification tasks and/or can be trained under a supervised learning system. Data classification can refer to predicting a class label for a new data entry, for example based on past occurrences of similar data. In many cases, data entries can include features that help in distinguishing them. In some embodiments, neurons in a trained neural network can perform a small mathematical operation on given input data, where their corresponding weights (or relevance) are used to produce an operand to be passed further into the network or given as the output. A synapse can connect two neurons with a corresponding weight/relevance. Prediction model 106 from FIG. 1 can be a neural network.

Conventional data quality and assessments can be performed using regex expressions (e.g., regular expressions), such as expressions created by an experienced regex programmer or data scientist. For example, the regex expressions are often small to reduce solving time and should not match unwanted data. At times, this can be a lengthy and tedious process as the data scientist often covers multiple formats of the relevant type of data.

In some embodiments, a neural network can be used for a similar task. Features can be extracted from data, for example its length, number of characters, its contents, and the like. These can then be fed to a neural network model to predict the type of data it is and, in some embodiments, operations that can be applied to it to improve quality. In some embodiments, once a model is trained/ready it can be deployed. For example, if a user wants to label a new type of data, then multiple entries of that type can be labeled and provided to the neural network (e.g., for training purposes). The neural network can then begin predicting labels for the new data type. In some embodiments, the neural network model can be built/trained based on the profile of data (e.g., a metadata profile) not on the actual data. This can cause embodiments of the tool to be flexible, widely usable, secure, and easily extendable.

With this flexible, widely usable, secure, and easily extendable machine learning based approach to data quality, embodiments can be implemented with a number of products or services (e.g., Oracle® products or services). A current approach that uses regex or semantic rule matching is computationally expensive. With the offline training of the neural network model, using the trained model to generate predictions that enhance data quality will have a positive impact on the performance of systems.

Figure 3:
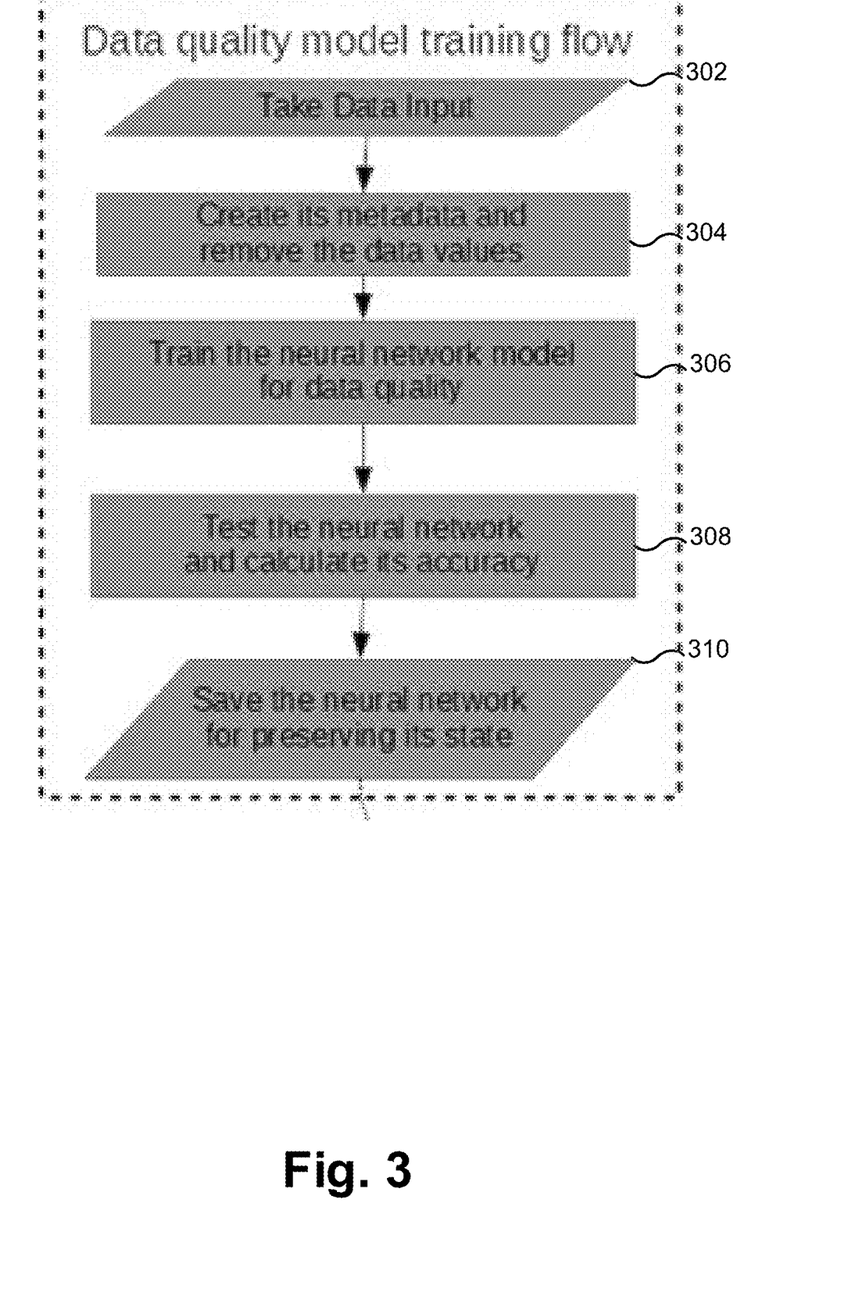
FIG. 3 illustrates a flow diagram for training a machine learning model according to an example embodiment.
Figure 6:
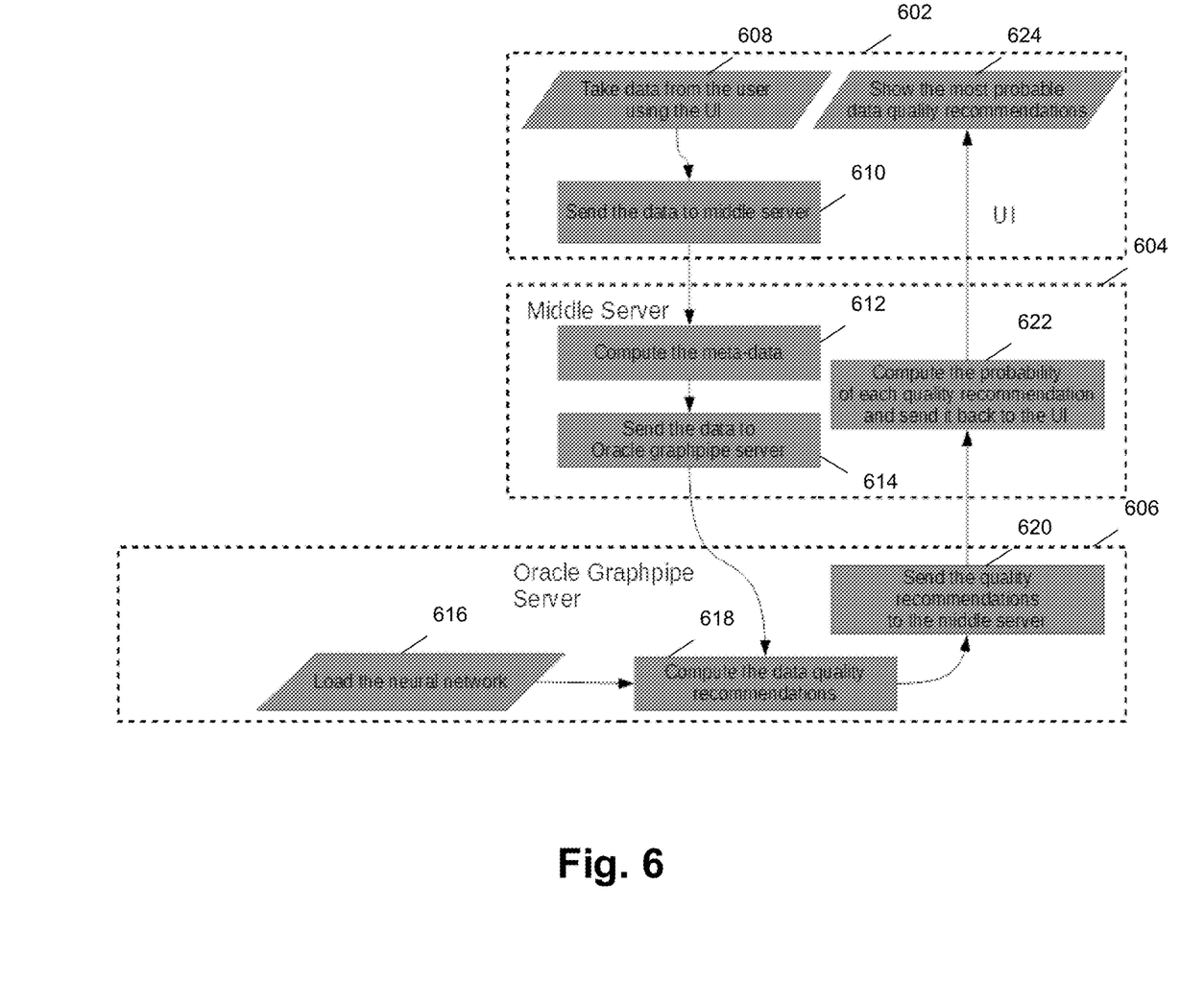
FIG. 6 illustrates a flow diagram for generating data quality recommendations using a machine learning model according to an example embodiment.
Figure 7:
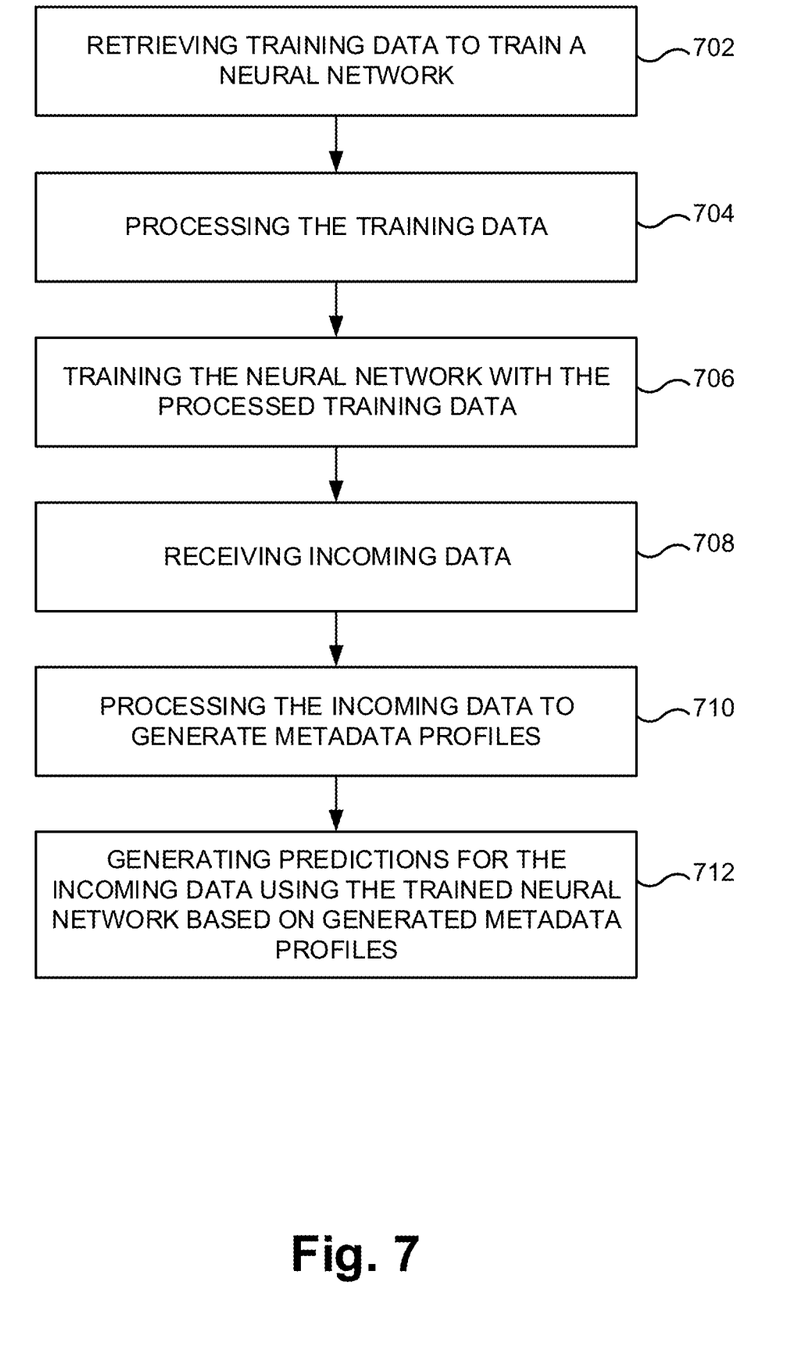
FIG. 7 illustrates a flow diagram for improving data quality using artificial intelligence according to an example embodiment.

In some embodiments, prediction model 106 from FIG. 1 can be trained to generate data quality improvement predictions. FIG. 3 illustrates a flow diagram for training a machine learning model according to an example embodiment. In some embodiments, the functionality of FIGS. 3, 6, and 7 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIGS. 3, 6, and 7 can be performed by one or more elements of system 200 of FIG. 2.

At 302, training data can be taken from different files and/or obtained from various sources. For example, a data warehouse or database can include labeled or structured data. Such data can include state names, state codes, credit card or bank card numbers, addresses, country names, country codes, county names, currency, dates, emails, gender, geolocation, locality, phone number, time, time zone, zip code, and the like. Data of one or more data types (e.g., categories of data) can be retrieved or accessed as training data 108 from FIG. 1. In some embodiments, training data 108 can be retrieved from data storage for enterprise applications, such as Oracle® Object Store Service, Oracle® Autonomous Data Warehouse, and the like. For example, training data 108 can be retail data (e.g., sales, returns, profits, and the like), financial data, measurement data (e.g., from measuring devices, such as Internet of Things ("IoT") devices), geographic data, demographic data, personal data, or any other suitable variety of data.

In some embodiments, a neural network can be trained for a given set of incoming input data 102. For example, it may be predicted or anticipated that a data dump may include a set of data types, such as a data dump related to retail sales including stock keeping numbers ("SKUs"), product descriptions, and the like. In anticipation of such a data dump, data from relevant data sources (e.g., enterprise data from retail organizations) can be retrieved for training purposes. In some embodiments, this enterprise data may not be retrieved, but rather accessed to generate metadata profiles about the data. Accordingly, training data 108 that is similar to an incoming batch of unstructured or unorganized data (e.g., input data 102) can be selected. In some embodiments, a previously trained neural network can be retrained (or updated) such that the training data that is similar to the batch of unstructured or unorganized data is used to retrain (or update) the model. In other words, a trained neural network can be extended using the training data that is similar to the batch of unstructured or unorganized data that is expected to be received.

At 304, metadata profiles descriptive of training data values and their structure or quality (e.g., categories) can be defined. For example, processing module 104 (or a similar processing module) can process training data 108 to generate the metadata profiles. In some embodiments, the metadata profiles are descriptive of data values within a plurality of entries or rows of data. For example, retrieved or accessed training data 108 can include entries or rows of data of a particular category (e.g., state names) that each include a data value. For example, data values for a plurality of state names can include:

MISSOURI; POMEROON-SUPENAAM; WYOMING; WEST VIRGINIA; UTAH; TEXAS; SOUTH DAKOTA; PENNSYLVANIA; NORTH CAROLINA; NEW YORK; MINNESOTA; MICHIGAN; MARYLAND; LOUISIANA; KENTUCKY; ILLINOIS; GEORGIA; FLORIDA; ARIZONA; ALASKA; ALABAMA; FREIBURG; GRAUBÃœNDEN; SOLOTHURN; TESSIN; NIEDERSACHSEN; BADEN-WÃœRTTEMBERG; WAIKATO; CANTERBURY; UPPER DEMERARA-BERBICE; UPPER TAKUTU-UPPER ESSEQUIBO; POTARO-SIPARUNI; CUYUNI-MAZARUNI; EAST BERBICE-CORENTYNE; MAHAICA-BERBICE; DEMERARA-MAHAICA; ESSEQUIBO ISLANDS-WEST DEMERARA; BARIMA-WAINI; MINSKAJA VOBLASTS'; HRODNA; HOMJEL'; VICEBSK; BRÃ‸ST; MAHILJOW; NORTHERN TERRITORY; NEW SOUTH WALES; WESTERN AUSTRALIA; QUEENSLAND; VICTORIA; SOUTH AUSTRALIA; TASMANIA; TUCUMÃ N; CHACO; SANTIAGO DEL ESTERO; SANTA FÃ‰; SAN LUIS; SAN JUAN; SALTA; MISIONES; MENDOZA; JUJUY; FORMOSA; ENTRE RÃ OS; CÃ"RDOBA; CATAMARCA; BUENOS AIRES; CORRIENTES; NEUQUÃ‰N; CHUBUT; LA RIOJA; SANTA CRUZ; TIERRA DEL FUEGO; LA PAMPA; RÃ O NEGRO; KASAI-ORIENTAL; SANT JULIÀ€ DE LÃ'RIA; LA MASSANA; ORDINO; CANILLO; THÃœRINGEN; SACHSEN-ANHALT; SARATOV; MOSKOVSKAJA OBLAST; KIROV

As shown, the state names can be from international countries, thus resulting in a large potential set of data values that can include a high number of variations (e.g., different character sets, lengths, spellings, use of special characters, and the like). In some embodiments, the number of entries or rows in the training data can be in the tens, hundreds, thousands, tens of thousands, or more. Training data for any other suitable data category, such as those examples listed herein, can be similarly implemented.

In some embodiments, metadata profiles can be generated for a set of training data from a known organizational structure (e.g., category). For example, fields for the metadata profiles can include data descriptive of an individual data value (e.g., a hash value of the data value, an individual data length, and the like) as well as data descriptive of other data values within the category (e.g., a mean length, a max length, and the like). In some embodiments, the metadata profile fields can include one or more of: data_hash; starts_with; ends_with; length; categorical; alphabetic; numeric; alphanumeric; maxlength; meanlength; Seven; Nine; Five; Three; Six; Eight; Zero; Two; Four; One; close braces; plus; hash; Euro; single-quote; equals; bslash; colon; semi-colon; dot; close parenthesis; Rupee; open square bracket; at; less; Pound; dollar; underscore; backquote; minus; ampersand; question mark; open parenthesis; tilde; double-quote; caret; pipe; percent; asterisk; comma; exclamation; mark; greater; fslash; close square bracket; open braces; special_character.

In some embodiments, a subset of these features can be based on the individual data value (e.g., individual entry or row of data) and a subset of these features can be based on multiple data values (e.g., multiple entries or rows of data). For example, the following can represent the individual data and multiple data features: Individual Data Features:

data_hash; starts_with; ends_with; length; close braces; plus; hash; Euro; single-quote; equals; bslash; colon; semi-colon; dot; close parenthesis; Rupee; open square bracket; at; less; Pound; dollar; underscore; backquote; minus; ampersand; question mark; open parenthesis; tilde; double-quote; caret; pipe; percent; asterisk; comma; exclamation; mark; greater; fslash; close square bracket; open braces; special_character; Seven; Nine; Five; Three; Six; Eight; Zero; Two; Four.

Multiple Data Features:

categorical; alphabetic; numeric; alphanumeric; maxlength; meanlength.

Figure 4:
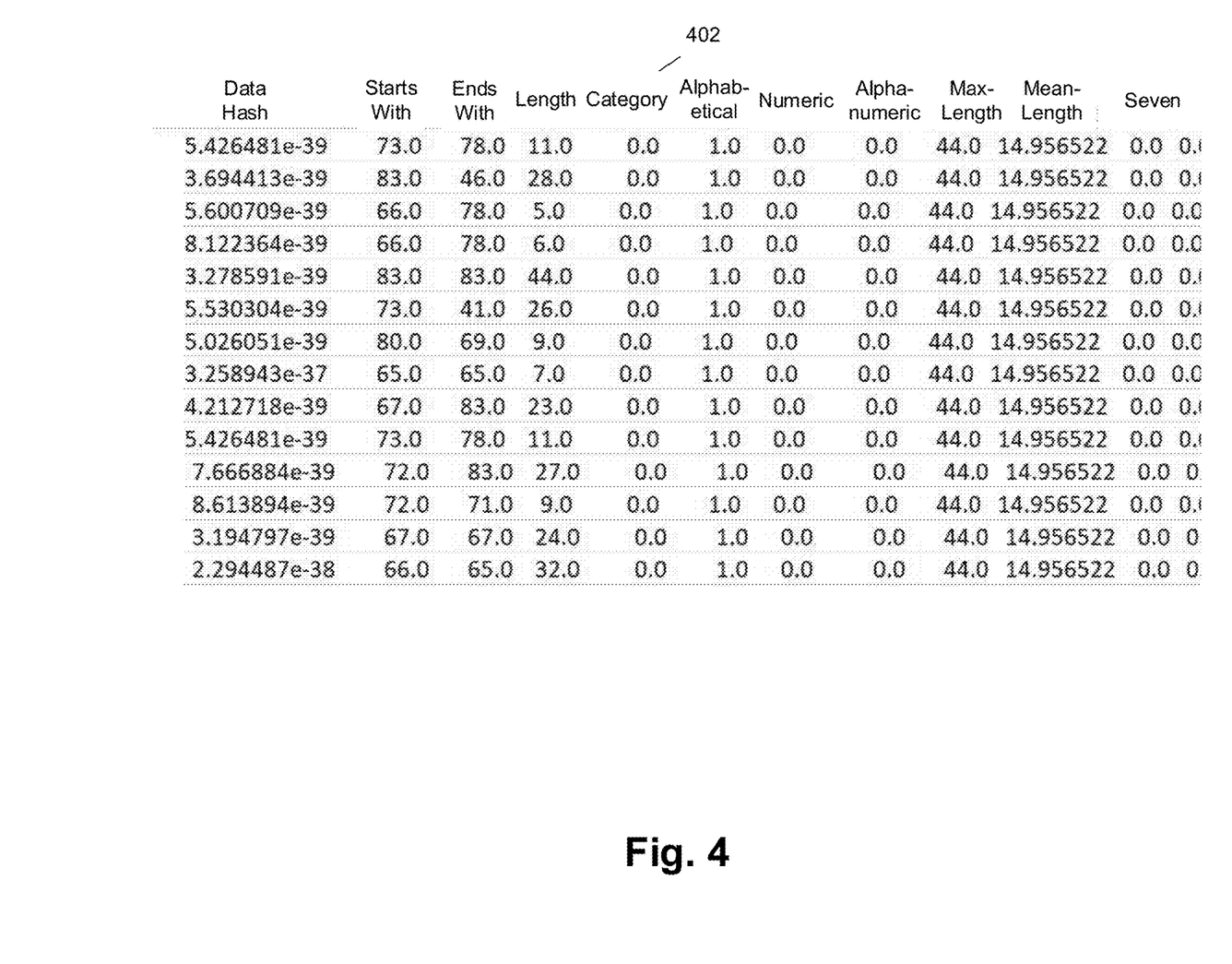
FIG. 4 illustrates a portion of sample metadata profiles according to an example embodiment.
Figure 5:
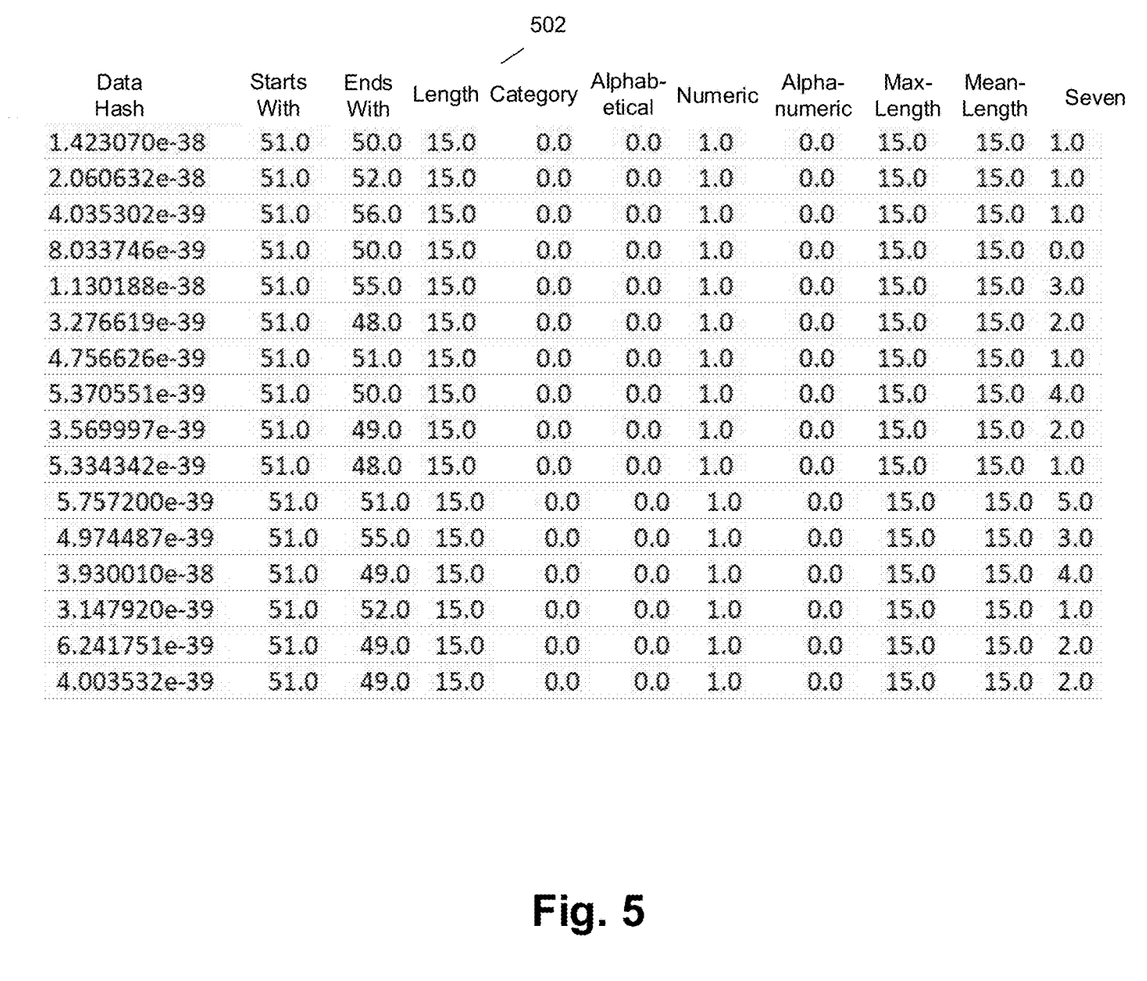
FIG. 5 illustrates a portion of sample metadata profiles according to an example embodiment.

Accordingly, an instance of training data (e.g., an individual metadata profile) can include features descriptive of an individual data value as well as information descriptive of other data values within the same organizational structure (e.g., category). FIGS. 4-5 illustrate a portion of a sample metadata profiles according to an example embodiment. Metadata profiles 402 illustrate metadata fields that describe an individual data value (e.g., hash value, length) as well as a group of data values (e.g., mean length, max length). Metadata profiles 502 similarly illustrate this concept. In some embodiments, a plurality of these metadata profiles can be used to train prediction module 106.

In some embodiments, the training metadata profiles can be varied based on the number and individual rows or elements of training data selected to generate a given profile. For example, a set of training data may include 1000 elements or rows. In some embodiments, the metadata profile generated for a given one of these rows or elements includes metadata fields that describe an individual data value (e.g., hash value, length) as well as multiple data values (e.g., mean length, max length). Accordingly, the metadata fields that describe multiple data values can be dependent on the number and individual rows or elements of training data that are selected to generate the metadata profile for the given row or element. For example, a first profile can be generated for the given row or element based on all 1000 of the rows or elements in the training data, a second profile can be generated based on the first 500 rows or elements of the training data, and a third profile can be generated based on the second 500 rows or elements of the training data. In this example, the metadata fields that are based on multiple data values may be different for the first, second, and third profiles because the number and individual data rows or elements used to generate the profiles are different (though the metadata fields based on the data value for the given row or element would be the same). In other words, the training data can be augmented to generate additional training data by varying the number and individual rows or elements used to generate metadata profiles for a given one of the training data rows or elements.

In some embodiments, the retrieved data and/or generated metadata profiles can be cleaned/discarded before training the model, and the training data can be split into training and testing instance. For example, some data retrieved and/or processed can include missing data, null data, data that includes characters inconsistent with the data category (e.g., numerical signs within a country name), and the like. Rules can be generated that clean and/or discard certain data elements/values/rows. For example, the rules can target the data values themselves (e.g., prior to generation of the metadata profiles). The rules may also target the generated metadata profiles, and thus the rules can be based on the various metadata profile features.

At 306, a plurality of metadata profiles can be used to train a neural network to predict data quality recommendations. For example, prediction module 106 can be trained by training data 108 (e.g., retrieved or access training data that has been processed to generate metadata profiles descriptive of the retrieved or accessed data).

The design of prediction module 106 can include any suitable machine learning model components (e.g., a neural network, support vector machine, specialized regression model, and the like). For example, a neural network can be implemented along with a given cost function (e.g., for training/gradient calculation). The neural network can include any number of hidden layers (e.g., 0, 1, 2, 3, or many more), and can include feed forward neural networks, recurrent neural networks, convolution neural networks, modular neural networks, and any other suitable type. In some embodiments, the neural network can be configured for deep learning, for example based on the number of hidden layers implemented. In some examples, a Bayesian network can be similarly implemented, or other types of supervised learning models.

For example, a support vector machine can be implemented, in some instances along with one or more kernels (e.g., gaussian kernel, linear kernel, and the like). In some embodiments, prediction module 106 can be multiple models stacked, for example with the output of a first model feeding into the input of a second model. Some implementations can include a number of layers of prediction models.

At 308, testing instances can be given to the model to calculate its accuracy. For example, a portion of training data 108/generated metadata profiles can be reserved for testing the trained model (e.g., rather than training the model). The accuracy measurement can be used to tune prediction module 106.

In some embodiments, accuracy assessment can be based on a subset of the retrieved/processed data. For example, a subset of the processed data (e.g., generated metadata profiles) can be used to assess the accuracy of a trained model. Some embodiments include using 75% of the processed data/retrieved data as training data and 25% as testing data. For example, the data can be randomly selected for the testing and training segments (e.g., 75% and 25% split) over various iterations of the testing.

In some embodiments, when testing, the trained model can output a category prediction for a given row/element of testing data. For example, the testing data can be a plurality of metadata profiles, and a category prediction can be generated for each row of the testing data. In some embodiments, each category prediction for each row of testing data can also include a probability criteria that indicates a probability for the category prediction. For example, the probability criteria can be the trained model's confidence in the category prediction for the given input instance of testing data.

In some embodiments, the design of prediction module 106 can be tuned based on accuracy calculations during training, retraining, and/or updated training. For example, tuning can include adjusting a number of hidden layers in a neural network, adjusting a kernel calculation used to implement a support vector machine, and the like. This tuning can also include adjusting/selecting features (e.g., metadata profile features) used by the machine learning model. Embodiments include implementing various tuning configurations (e.g., different versions of the machine learning model and features) while training/calculating accuracy in order to arrive at a configuration for prediction module 106 that, when trained, achieves desired performance (e.g., performs predictions at a desired level of accuracy, run according to desired resource utilization/time metrics, and the like). For example, certain metadata profile fields can be excluded in order to increase accuracy calculation and/or simplify the implementation of embodiments.

At 310, the trained model can be saved or stored for further use and for preserving its state. For example, the training of prediction module 106 can be performed "offline" and the trained model can then be stored and used as needed to achieve time and resource efficiency.

In some embodiments, a trained prediction module 106 can be deployed to receive input data 102 (e.g., after being processed by processing module 104), and generate data quality predictions as output 110. For example, input data 102 can be a data dump from an unstructured data source, or can be any other suitable data. In some embodiments, input data 102 can represent data of a particular category, however this category may not be known. In some embodiments, input data 102 may represent data from a plurality of categories.

Processing module 104 can process input data 102 to generate metadata profiles for the input data. For example, the metadata profiles can be similar to the metadata profiles used to train prediction module 106. In some embodiments, fields for the metadata profiles can include data descriptive of an individual data value (e.g., a hash value of the data value, an individual data length, and the like) as well as data descriptive of other data values within input data 102 (e.g., a mean length, a max length, and the like). In some embodiments, the metadata profile fields can include one or more of: data_hash; starts_with; ends_with; length; categorical; alphabetic; numeric; alphanumeric; maxlength; meanlength; Seven; Nine; Five; Three; Six; Eight; Zero; Two; Four; One; close braces; plus; hash; Euro; single-quote; equals; bslash; colon; semi-colon; dot; close parenthesis; Rupee; open square bracket; at; less; Pound; dollar; underscore; backquote; minus; ampersand; question mark; open parenthesis; tilde; double-quote; caret; pipe; percent; asterisk; comma; exclamation; mark; greater; fslash; close square bracket; open braces; special_character. In some embodiments, the number of entries or rows of data in input data 102 can be tens, one hundred, hundreds, thousand, or more.

Accordingly, an instance of input data 102 after processing (e.g., an individual metadata profile) can include features descriptive of an individual data value as well as information descriptive of other data values within the input data. FIGS. 4-5 illustrate a portion of a sample metadata profiles according to an example embodiment. Metadata profiles 402 can illustrate metadata profiles that describe an individual data value (e.g., hash value, length) as well as a group of data values (e.g., mean length, max length). Metadata profiles 502 similarly illustrate this concept.

The generated metadata profiles can then be fed into trained prediction module 106. In some embodiments, each individual metadata profile can be fed into the prediction module to generate quality predictions (e.g., a data category). Because embodiments use training data including metadata fields based on both an individual data value (e.g., for an instance/row of training data) as well as groups of data values (e.g., groups of data values for a plurality of instances in a given data category), trained prediction module 106 can be configured to use the features from the metadata profiles extracted from input data 102 to generate data category predictions.

In an embodiment, example of input data 102 can be:
ISLE OF MAN; SOUTH GEORGIA AND SOUTH S.S.; BENIN; BHUTAN; SOUTH GEORGIA AND THE SOUTH SANDWICH ISLANDS; IRAN (ISLAMIC REPUBLIC OF); PALESTINE; ALBANIA; COCOS (KEELING) ISLANDS; ISLE OF MAN; HEARD AND MC DONALD ISLANDS; HONG KONG; CENTRAL AFRICAN REPUBLIC; BONAIRE, SINT EUSTATIUS AND SABA; BHUTAN; SMALLER TERRITORIES OF CHILE; CAMEROON; BARBADOS; TRINIDAD AND TOBAGO; HEARD AND MC DONALD ISLANDS; ARGENTINA; PARAGUAY; SWITZERLAND; TAIWAN; COMOROS; EAST TIMOR; LITHUANIA; VENEZUELA, BOLIVARIAN REPUBLIC OF; LITHUANIA; SMALLER TERRITORIES OF THE UK; ANTIGUA AND BARBUDA; COMOROS; SRI LANKA; HONDURAS; SINGAPORE; SYRIA; FINLAND; WALLIS AND FUTUNA ISLANDS; OMAN; SYRIA; AUSTRIA; SOUTH GEORGIA AND THE SOUTH SANDWICH ISLANDS For example, metadata profiles 402 illustrated in FIG. 4 can describe this example input data. The metadata profiles can then be fed into trained prediction module 106 of FIG. 1 (e.g., a trained neural network) to generate data quality predictions. For example, a prediction for each row of input (e.g., each metadata profile) can be 'country' based on the neural network being trained to discern countries from among other data categories. Other metadata profiles can be used to generate other data predictions, such as "bank card", "country code", or other suitable data categories.

In some embodiment, use of the metadata profiles to train and generate data quality predictions maintains a level of security that other techniques are not able to achieve. For example, use of the metadata profiles rather than the actual data ensures that the actual data can be kept secure. Embodiments achieve data quality predictions by using metadata descriptive of the actual data so that the actual data is not needed in order to enhance data quality. For example, secure incoming data can have its quality enhanced by using metadata representative of the secure incoming data. Similarly, embodiments of the neural network can be trained using metadata profiles of secure training data, thus keeping this training data secure.

FIG. 6 illustrates a flow diagram for generating data quality recommendations using a machine learning model according to an example embodiment. For example, one or more of the computing elements from FIG. 1 can be used to implement the functionality of FIG. 6.

FIG. 6 illustrates client 602, middle server 604, and graph server 606. For example, graph server 606 can be an Oracle® graphpipe server, or any other suitable server. Examples of client 602 are user facing interfaces based on one or more web technologies (e.g., JavaScript). Examples of middle server 604 are an Oracle® WebLogic server, Python Flask, and the like. In some embodiments, data can be received from one or more sources (e.g., based on a user using a user interface). For example, at 608 a user can navigate a user interface to select data (e.g., data stored on-premise or in a cloud) for quality enhancement. In some embodiments, the selected data can include a plurality or rows or elements. At 610, the data can be transmitted to/received by middle server 604.

In some embodiments, at 612 middle server 604 can process the received data to generate metadata profiles comprising metadata fields. At 614, the generated metadata profiles and metadata fields can be sent to graph server 606. At 616, a trained neural network can be loaded. In some embodiments, the neural network can be trained and deployed offline such that it is ready to perform data quality predictions on the fly.

At 618, the metadata profiles can be fed into the trained neural network to generate data quality predictions. For example, the data quality predictions can include data categories for the data received/selected at 608. In some embodiments, a probability criteria or confidence is generated for each category prediction. For example, for a given row/element of input data (e.g., a given input metadata profile), the trained model can generate a category prediction for the model and a probability/confidence for the predicted category (e.g., 50%, 60%, 70%, 80%, 90%, and the like).

At 620, the data quality predictions can be transmitted to/received by middle server 604. At 622, middle server 604 can process a probability for the data predictions. For example, middle server 604 can implement a probability or confidence threshold for the category predictions. In some embodiments, data predictions (e.g., category predictions) that have a corresponding probability or confidence below a threshold (e.g., 60%, 70%, 80%, and the like) can be discarded or flagged (e.g., as low probability predictions).

At 622, the generated data quality predictions can also be transmitted to/received by client 602, in some embodiments along with the calculated probabilities. At 624, client 602 can display the data quality predictions (e.g., in a user interface), and can also display the calculated probabilities. In some embodiments, data quality predictions that meet a threshold (e.g., threshold implemented by middle server 604) are displayed and/or the data quality predictions can be sorted based on probability (e.g., high to low).

In some embodiments, a user can confirm the data quality predictions. For example, via an interface a user can confirm the data quality predictions (e.g., predicted categories) for the initially selected data (e.g., at 608). Based on the confirmation, the selected data can incorporate the augmented quality. For example, structure can be added to the selected data (e.g., using predicted data categories), such as by storing the data in a structured manner (e.g., within a structured database or data schema). In an example, the selected data may be stored within an existing data schema that includes the predicted category for the data, thus allowing the selected data (which was previously unstructured) to be augmented and stored with structured data. In some embodiments, the data can be augmented automatically (e.g., without user confirmation), such as based on data quality predictions above a certain probability/confidence threshold (e.g., a category prediction above 90%).

In some embodiments, additional quality augmentation can be performed, such as based on the quality predictions generated. For example, predicted data categories for selected data can be gender, and a subset of data values for the category can be known (e.g., Male, Female, Non-binary). In some embodiments, transformations can be suggested, such as transformations that standardize the data values within the category. These suggested transformations can include transforming characters to capital or lowercase, transforming words to a single character (e.g., M, F, N), a combination of these, and the like.

In some embodiments, a match for a given character (or string of characters) within a data value can be used to implement transformations. For example, a match for F or W can be searched to determine whether gender is female or woman. When F or W is not found, M, ale, or man can be searched to determine whether gender is male or man. When it is determined that gender is neither male or female, B or Non can be searched to determine whether gender is non-binary (or it can be determined that gender is non-binary when it is not determined to be male or female). In some embodiments, this match/search can be used to implement one or more of the transformations, and multiple of the transformations can be performed in combination. These suggestions can standardize the format of the data, thus enhancing quality, and, in some cases, reducing the size of the data to enhance storage efficiency.

FIG. 7 illustrates a flowchart for improving data quality using artificial intelligence according to an example embodiment. At 702, training data for training a neural network can be retrieved from a structured data source. For example, training data can be received from a structured data source (or multiple sources) such as a database, data warehouse, or any other suitable source. In some embodiments, the training data is grouped into data categories such that multiple rows or elements of data exist in each category.

At 704, the training data is processed to generate metadata profiles. For example, each group of data (e.g., labeled with a data category) is processed to generate metadata profiles for the individual rows/elements of data in the groups. In some embodiments, training features of the training data include the training metadata profiles that are labeled with data categories. For example, a given training metadata profile with a given labeled data category is generated by processing a plurality of data values of the given data category (e.g., processing data values for data rows/elements within the group associated with the data category).

At 706, the neural network can be trained using the processed training data. For example, a neural network can be trained using the generated metadata profiles and labeled data categories. In some embodiments, the neural network is trained off-line and is then received/loaded to generate data quality predictions. In some embodiments, the trained neural network is configured to predict a data category for incoming data. For example, training the neural network can include learning a set of parameters that are configured to discriminate among a plurality of data categories based on input features comprising metadata fields of the metadata profiles.

At 708, incoming data that includes a plurality of rows can be received. For example, the incoming data can be data that lacks organization (e.g., quality), such as categorization. At 710, the incoming data can be processed, where the processing extracts features about the plurality of rows of data to generate metadata profiles that represent the incoming data. For example, processing the incoming data can include collapsing the plurality of rows of data into metadata profiles that include a plurality of metadata fields, wherein at least one metadata field represents a length for the plurality of rows of data and the data value for the one metadata field comprises a mean length of the data values for the plurality of rows of data.

In some embodiments, a first metadata profile for one of the rows of the incoming data is a single row of data comprising the plurality of metadata fields. For example, at least one metadata field in the first metadata profile has a value generated based on data values for the plurality of rows of incoming data and at least one metadata field in the first metadata profile has a value based solely on the one row of incoming data.

At 712, using the trained neural network, a data category for the incoming data can be predicted, where the prediction is based on the generated metadata profiles for the incoming data. For example, a metadata profile can be generated for each row of the incoming data, and a prediction (e.g., data category prediction) can be generated for each metadata profile. In some embodiments, a data category prediction and a corresponding confidence value can be generated for each metadata profile. For example, predicted data categories with a confidence value that fails to meet a threshold can be discarded. In some embodiments, the incoming data is associated with unstructured data, and the predicted data category is used to store the associated unstructured data in a structured data store.

Embodiments improve data quality using artificial intelligence. Data can be received, obtained, or otherwise be made available in a variety of circumstances, and in some instances the data may not include metadata, structure, or other identifying information. For example, a data dump may include uncategorized or unstructured data, and it may be beneficial to store this data in a database. Data that does not include accompanying information, structure, or other organizational aspects can be difficult to store and manage. In general, quantities of data that lack structure and consistency can be considered poor quality data. Data that lacks quality poses significant challenges. For example, it can be difficult to store unstructured data in a structured database or other data structure. The benefits of big data, such as data analytics or machine learning, can also be limited with poor quality data. Embodiments aim to improve the quality of data using artificial intelligence, such as a machine learning model.

Embodiments include a trained machine learning model, such as a neural network, that is trained based on data with a known structure, such as labeled and/or categorized data. For example, features from this data can be extracted to generate metadata profiles, which can be used to train the machine learning model. Once trained, the machine learning model can be configured to receive input data (e.g., processed incoming data) and generate data quality improvement predictions. For example, the incoming data can be unstructured, lack consistency, or otherwise lack data properties related to quality. The incoming data can be processed, such as to extract features from the data and generate metadata profiles. In some embodiments, the processed incoming data (e.g., metadata profiles) can be fed to the trained machine learning model as input, and the model can generate predictions to improve the quality of the incoming data. For example, data categorization predictions can be generated that categorize this incoming data. These category predictions can improve the organization/structure of the data, and thus improve the data quality.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

We claim:

1. A method for improving data quality using artificial intelligence, the method comprising:
    receiving incoming data comprising a plurality of rows of data and a trained machine learning model that is configured to predict a data category for the incoming data, the trained machine learning model comprising a set of learned parameters that are configured to discriminate among a plurality of data categories, wherein the incoming data comprises unstructured or semi-structured data;
    generating input data by extracting features about the plurality of rows of data;
    predicting, by the trained machine learning model using the generated input data, one or more predicted data categories for the incoming data, wherein the trained machine learning model processes the input data using the set of learned parameters to predict the predicted data categories;
    suggesting data transformations for a subset of data values of the incoming data by applying one or more transformation rules to the subset of data values, wherein the applied transformation rules are based on at least a predicted data category for the subset of data values;
    transforming, based on at least a portion of the suggested data transformations, at least a portion of the subset of data values, wherein the transforming alters the portion of the subset of data values according to the applied one or more transformation rules; and
    storing the transformed data values in a structured data store using at least the predicted data category for the subset of data values.

2. The method of claim 1, wherein the incoming data comprises unstructured data, and the predicted data category for the subset of data values and the suggested data transformations are used to store the transformed data according to a data schema of the structured data store.

3. The method of claim 2, wherein the set of learned parameters of the trained machine learning model are configured to discriminate among a plurality of data categories from the data schema of the structured data store.

4. The method of claim 3, wherein the set of learned parameters are trained to discriminate among the plurality of data categories from the data schema using training data comprising data labels that correspond to the data categories from the data schema.

5. The method of claim 1, wherein transforming the portion of the subset of data values standardizes these data values to one or more standard values defined relative to at least one of the one or more predicted data categories for the subset of data values.

6. The method of claim 5, wherein transforming the portion of the subset of data values reduces a size of the portion of the subset of data values.

7. The method of claim 1, wherein generating the input data further comprises:
    generating one or more metadata profiles that represent the incoming data using the extracted features, wherein the generated input data comprises the generated metadata profiles.

8. The method of claim 1, wherein generating the predicted one or more data categories for the incoming data includes predicting a confidence for the one or more predicted data categories.

9. A system for improving data quality using artificial intelligence, the system comprising:
    a processor; and
    a memory storing instructions for execution by the processor, the instructions configuring the processor to:
    receive incoming data comprising a plurality of rows of data and a trained machine learning model that is configured to predict a data category for the incoming data, the trained machine learning model comprising a set of learned parameters that are configured to discriminate among a plurality of data categories, wherein the incoming data comprises unstructured or semi-structured data;
    generate input data by extracting features about the plurality of rows of data;
    predict, by the trained machine learning model using generated input data, one or more predicted data categories for the incoming data, wherein the trained machine learning model processes the input data using the set of learned parameters to predict the predicted data categories;
    suggest data transformations for a subset of data values of the incoming data by applying one or more transformation rules to the subset of data values, wherein the applied transformation rules are based on at least a predicted data category for the subset of data values;
    transform, based on at least a portion of the suggested data transformations, at least a portion of the subset of data values, wherein the transforming alters the portion of the subset of data values according to the applied one or more transformation rules; and
    store the transformed data values in a structured data store using at least the predicted data category for the subset of data values.

10. The system of claim 9, wherein the incoming data comprises unstructured data, and the predicted data category for the subset of data values and the suggested data transformations are used to store the transformed data according to a data schema of the structured data store.

11. The system of claim 10, wherein the set of learned parameters of the trained machine learning model are configured to discriminate among a plurality of data categories from the data schema of the structured data store.

12. The system of claim 11, wherein the set of learned parameters are trained to discriminate among the plurality of data categories from the data schema using training data comprising data labels that correspond to the data categories from the data schema.

13. The system of claim 9, wherein transforming the portion of the subset of data values standardizes these data values to one or more standard values defined relative to at least one of the one or more predicted data categories for the subset of data values.

14. The system of claim 13, wherein transforming the portion of the subset of data values reduces a size of the portion of the subset of data values.

15. The system of claim 9, wherein generating the input data further comprises:
generate one or more metadata profiles that represent the incoming data using the extracted features, wherein the generated input data comprises the generated metadata profiles.

16. The system of claim 9, wherein generating the predicted one or more data categories for the incoming data includes predicting a confidence for the one or more predicted data categories.

17. A non-transitory computer readable medium having instructions stored thereon that, when executed by a processor, cause the processor to improve data quality using artificial intelligence, wherein, when executed, the instructions cause the processor to:
receive incoming data comprising a plurality of rows of data and a trained machine learning model that is configured to predict a data category for the incoming data, the trained machine learning model comprising a set of learned parameters that are configured to discriminate among a plurality of data categories, wherein the incoming data comprises unstructured or semi-structured data;
generate input data by extracting features about the plurality of rows of data;
generate, by the trained machine learning model using the generated input data, one or more predicted data categories for the incoming data, wherein the trained machine learning model processes the input data using the set of learned parameters to predict the predicted data categories;
suggest data transformations for a subset of data values of the incoming data by applying one or more transformation rules to the subset of data values, wherein the applied transformation rules are based on at least a predicted data category for the subset of data values;
transform, based on at least a portion of the suggested data transformations, at least a portion of the subset of data values, wherein the transforming alters the portion of the subset of data values according to the applied one or more transformation rules; and
store the transformed data values in a structured data store using at least the predicted data category for the subset of data value.

18. The computer readable medium of claim 17, wherein the incoming data comprises unstructured data, and the predicted data category for the subset of data values and the suggested data transformations are used to store the transformed data according to a data schema of the structured data store.

* * * * *

UNITED STATES PATENT AND TRADEMARK OFFICE
CERTIFICATE OF CORRECTION

PATENT NO. : 12,204,508 B2
APPLICATION NO. : 18/082813
DATED : January 21, 2025
INVENTOR(S) : Srinivasulu et al.

Page 1 of 1

It is certified that error appears in the above-identified patent and that said Letters Patent is hereby corrected as shown below:

In the Specification

In Column 7, Line 39, delete "BRÃˆST;" and insert -- BRÃST; --, therefor.

In Column 7, Line 43, delete "FÃ‰oo;" and insert -- FÃ‰o; --, therefor.

In Column 7, Line 47, delete "NEUQUÃ‰ooN;" and insert -- NEUQUÃ‰oN; --, therefor.

In Column 7, Line 49, delete "JULIÃ€ DE" and insert -- JULIÃ€ DE --, therefor.

In Column 7, Line 52, delete "KIROV" and insert -- KIROV. --, therefor.

In Column 11, Line 35, delete "ISLANDS" and insert -- ISLANDS. --, therefor.

In the Claims

In Column 18, Line 6, in Claim 17, delete "generate," and insert -- predicting, --, therefor.

Signed and Sealed this
Eighth Day of April, 2025

Coke Morgan Stewart
*Acting Director of the United States Patent and Trademark Office*